Patented Aug. 11, 1931

1,817,931

UNITED STATES PATENT OFFICE

KURT RIPPER, OF VIENNA, AUSTRIA, ASSIGNOR, BY MESNE ASSIGNMENTS, TO POLLOPAS LIMITED, OF NOTTINGHAM, ENGLAND, A COMPANY OF ENGLAND

PROCESS FOR THE TREATMENT OF CONDENSATION PRODUCTS OF CARBAMIDE OR ITS DERIVATIVES WITH ALDEHYDES

No Drawing. Application filed September 22, 1925, Serial No. 57,942, and in Austria October 1, 1924.

It is well known that by the condensation of carbamide or its derivatives with aldehydes, especially formaldehyde, one can obtain condensation products in the shape of artificial bodies of great beauty and permanence. This reaction at first gives rise to viscous initial products, soluble in water and containing in sol form the emulsion colloid formed by condensation. These initial products can be used as varnishes or as a material for impregnation. In the transformation of the sol into hydrogel (or organogel) these initial products congeal into semi-solid intermediate products having but a small degree of solubility in water. These semisolid intermediate products finally change by warming, through the transformation of the hydrogel or organogel into gel, into the hard final products which are insoluble in water. This operation is described as "hardening".

The opinion was hitherto held that the final products, which are as completely hardened as possible, are entirely incapable of reaction and are insoluble in the usual solvents. The waste material arising from the manufacture of the artificial masses on a large scale and in their further machining (as articles turned on a lathe, for instance) and likewise the intermediate products arising in the course of the process would therefore be lost—a loss which may amount to a considerable figure, since the materials in question are highly expensive.

It has now been found that even the condensation products of this kind which have been hardened up to the highest degree of indifference to water still possess a certain capability of reaction. The hardened condensation products can indeed—preferably in fragmentary form—be put back to the state of sol, by appropriate means. It might be left undecided, whether it may be concluded from this that the colloids in question, contrary to the hitherto accepted view, are reversible under certain conditions, or whether the sols produced according to the present method are different from those formed in the reaction. The viscous liquid products thus produced can in any case be used, just as the initial products of the original reaction, as varnishes or impregnating agents, and they can also be converted into hard final products by entirely similar methods. Of course, the semi-solid intermediate products into which the initial products first change in the course of the reaction, by losing their solubility in water, admit likewise of a return to the state of sol.

The hardened gel can be retransformed to the sol condition by submitting it in a fine state of division to the action of suitable solvents, with heat. As solvent for instance a solution of formaldehyde, with or without the addition of catalytic agents, comes in for special consideration. It can be regarded as immaterial whether the action of the formaldehyde leads to a mere dispersion, or if at the same time a condensation also takes place. There are obtained in any case by the treatment of the broken up hard condensation products (or semi-solid intermediate products) with formaldehyde, either in the presence of condensing agents or without these, viscous solutions which exhibit the same properties as the original reaction products which are insoluble in water, in so far as after suitable condensation, or after as thorough evaporation of the solvent as possible, they can be made into hard artificial masses.

As solvents for the gels mentioned mineral acids may be used, especially in the form of their aqueous solutions. This is a very astonishing fact, because, as is well known, the liquid initial products of the reaction change into hard porous masses which cannot be further treated, through the addition of even quite small quantities of mineral acids. On the other hand, the finally hardened gel when boiled, for instance, with 10% hydrochloric, nitric or sulphuric acid, passes very quickly into a water-clear solution, from which, by suitable procedure, cooling, for instance, a bulky white precipitate can be obtained, which can be purified by repeated dissolving and precipitating and then is preferably dried after washing. This powder can thereafter be brought into the sol condition by means of solvents, especially by the action of a solution of formaldehyde (either in the presence of catalytic agents or not) and the water-clear, more or less viscous solutions thus obtained can be used for the production of varnish or as an impregnating agent, or they can be turned into solid masses by heating.

This powder can also be advantageously employed as fillers for the liquid condensation products made according to the usual methods from urea and formaldehyde or as filling for other purposes, for instance, for caoutchouc, phenol-formaldehyde - condensation products, natural resins, etc. When used as fillers for the urea-formaldehyde condensation products, the striking effect is shown that the water is much more quickly expelled from the jellies and a considerably quicker hardening is obtained, this resulting in the obtainment of final products of especially great resistance to the action of fluids.

Instead of acid solutions, there may be used for the same purpose solutions which give acids when warmed with the condensation products of carbamide and its derivatives and aldehydes. This is, for instance, especially true of the ammonium salts of strong acids and similar products which give free acids with the small quantities of formaldehyde which split off from the condensation products during heat treatment. By the addition from the beginning, of a little free formaldehyde, the reaction is facilitated. Also ester acids, acid chlorides, acid salts or other substances which are easily saponified or decomposed, by free acids, are suitable for the purpose in view.

All the processes hitherto known for the production or for the further treatment of sols or of gels may be utilized in a suitable manner.

I wish to be included along with urea in the designation "a urea" used in the following claims thio-urea and substitution products of urea and of thio-urea. The formaldehyde may be used either in the form of the commercial aqueous solution or in the gaseous state or in the form of the polymers or in that of a solution of anhydrous formaldehyde.

What I claim is:

1. A process of treating solid and semi-solid amorphous condensation products of urea and formaldehyde which comprises treating such products with a solvent of the class composed of formalin, mineral acids, and acid forming materials, in such amounts as to dissolve the said condensation products.

2. A process of treating solid and semi-solid amorphous condensation products of urea and formaldehyde which comprises reducing such products to a fine state of division, and thereafter treating such products with a solvent of the class composed of formalin, mineral acids, and acid forming materials, in such amounts as to dissolve the said condensation products.

3. A process for the further treatment of condensation products of a urea with formaldehyde which comprises the transformation of solid and semi-solid amorphous resinous condensation products of a urea with formaldehyde into the sol condition by the action of solvents having acid properties.

4. A process for the further treatment of condensation products of a urea with formaldehyde which comprises the transformation of solid and semi-solid amorphous resinous condensation products of a urea with formaldehyde into the sol condition by the action of solvents having acid properties in the presence of heat.

5. A process for the further treatment of condensation products of a urea with formaldehyde which comprises the transformation of solid and semi-solid amorphous resinous condensation products of a urea with formaldehyde into the sol condition by the action of solvents having acid properties in the presence of heat after being first brought to a fine state of division.

6. A process for the further treatment of condensation products of a urea with formaldehyde which comprises the transformation of solid and semi-solid amorphous resinous condensation products of a urea with formaldehyde into the sol condition by the action of solvents having acid properties in the presence of heat after being first brought to a fine state of division and finally converting the said material into shaped solid final products.

7. A process for the further treatment of condensation products of a urea with formaldehyde which comprises the transformation of solid and semi-solid resinous condensation products of a urea with formaldehyde into the sol condition by the action of solvents having acid properties, and that a powdery mass is precipitated from the resulting solution.

8. A process for the further treatment of condensation products of a urea with formaldehyde which comprises the transformation of solid and semi-solid resinous condensation products of a urea with formaldehyde into the sol condition by the action of solvents having acid properties in the presence of heat, and a powdery mass is precipitated from the resulting solution on cooling.

9. A process for the further treatment of condensation products of a urea with formaldehyde which comprises the transformation of solid and semi-solid resinous condensation products of a urea with formaldehyde into the sol condition by the action of solvents having acid properties in the presence of heat, and a powdery mass is precipitated from the resulting solution on cooling, this mass being then redissolved.

10. A process for the further treatment of condensation products of a urea with formaldehyde which comprises the transformation of solid and semi-solid resinous condensation products of a urea with formaldehyde into the sol condition by the action of solvents having acid properties in the presence of heat, and a powdery mass is precipitated from the resulting solution on cooling, this mass being then washed, dried and redissolved.

11. A process for the further treatment of condensation products of a urea with formaldehyde which comprises the transformation of solid and semi-solid resinous condensation products of a urea with formaldehyde into the sol condition by the action of solvents having acid properties in the presence of heat, and a powdery mass is precipitated from the resulting solution on cooling, this mass being then washed, dried and redissolved by the action of formaldehyde.

12. A process for the further treatment of condensation products of a urea with formaldehyde which comprises the transformation of solid and semi-solid resinous condensation products of a urea with formaldehyde into the sol condition by the action of solvents having acid properties in the presence of heat, and a powdery mass is precipitated from the resulting solution on cooling, this mass being then washed, dried and redissolved by the action of formaldehyde with addition of condensing agents.

13. A process for the further treatment of condensation products of urea with formaldehyde which comprises the transformation of solid and semi-solid resinous condensation products of a urea with formaldehyde into the sol condition by the action of solvents having acid properties in the presence of heat, and a powdery mass is precipitated from the resulting solution on cooling, this mass being then washed, dried and redissolved by the action of formaldehyde with addition of condensing agents, whereafter the resulting solution is transformed into solid final products by the action of heat.

14. A process of converting insoluble condensation products of urea and formaldehyde into a soluble form, by heating the product with aqueous formaldehyde.

In testimony whereof I have affixed my signature.

KURT RIPPER.